United States Patent
Yin et al.

(10) Patent No.: US 10,481,426 B2
(45) Date of Patent: Nov. 19, 2019

(54) METHOD FOR MANUFACTURING COLOR FILTER SUBSTRATE, COLOR FILTER SUBSTRATE AND DISPLAY PANEL

(71) Applicants: BOE Technology Group Co., Ltd., Beijing (CN); Hefei Xinsheng Optoelectronics Technology Co., Ltd., Hefei (CN)

(72) Inventors: Rui Yin, Beijing (CN); Sang Man Yuk, Beijing (CN); Jian Ma, Beijing (CN); Ya Yu, Beijing (CN); Guoqiang Zhong, Beijing (CN)

(73) Assignees: BOE TECHNOLOGY GROUP CO., LTD., Beijing (CN); HEFEI XINSHENG OPTOELECTRONICS TECHNOLOGY CO., LTD, Hefei, Anhui (CN)

( * ) Notice: Subject to any disclaimer, the term of this patent is extended or adjusted under 35 U.S.C. 154(b) by 10 days.

(21) Appl. No.: 15/838,505

(22) Filed: Dec. 12, 2017

(65) Prior Publication Data
US 2018/0275453 A1 Sep. 27, 2018

(30) Foreign Application Priority Data
Mar. 24, 2017 (CN) .......................... 2017 1 0184697

(51) Int. Cl.
*G02F 1/1335* (2006.01)
(52) U.S. Cl.
CPC .. *G02F 1/133512* (2013.01); *G02F 1/133516* (2013.01)
(58) Field of Classification Search
CPC ..................... G02F 1/133512; G02F 1/133516
See application file for complete search history.

(56) References Cited

U.S. PATENT DOCUMENTS

| | | | | |
|---|---|---|---|---|
| 2005/0157157 A1* | 7/2005 | Tsukamoto | ............ | B41M 5/265 347/213 |
| 2015/0286097 A1* | 10/2015 | Lee | ................... | G02F 1/133617 349/61 |

(Continued)

FOREIGN PATENT DOCUMENTS

| CN | 101169550 A | 4/2008 |
|---|---|---|
| CN | 102799017 A | 11/2012 |

(Continued)

OTHER PUBLICATIONS

Chinese Office Action dated Mar. 4, 2019 in 201710184697.6.

*Primary Examiner* — Hoan C Nguyen
(74) *Attorney, Agent, or Firm* — Fay Sharpe LLP

(57) ABSTRACT

The present disclosure relates to a method for manufacturing a color filter substrate, a color substrate and a display panel in the field of display technology. The method includes: forming a color resistance layer on a basal substrate; forming a conversion layer on the basal substrate with the color resistance layer, wherein the thickness of the conversion layer is greater than the thickness of the color resistance layer and the conversion layer is convertible in color under the irradiation of preset light rays; and irradiating the conversion layer with the preset light rays so that the conversion layer is converted to a two-layer structure consisting of a black matrix (BM) pattern and a transparent over cover, wherein the BM pattern is disposed at the side of the conversion layer close to the basal substrate. In the present disclosure, it is not necessary to form the BM pattern and the over cover layer in separate two steps, because the conversion layer is formed on the basal substrate, and then is directly converted to the two-layer structure consisting of the BM pattern and the over cover layer by the preset light rays, thereby solving the problem that the method for manufacturing a color filter substrate is relatively compli- (Continued)

cated in the related art, and achieving the effect of simplifying the method for manufacturing the color filter substrate.

11 Claims, 7 Drawing Sheets

(56) References Cited

U.S. PATENT DOCUMENTS

| | | | |
|---|---|---|---|
| 2016/0190515 A1* | 6/2016 | Huang | G02B 5/201 257/13 |
| 2018/0039131 A1* | 2/2018 | Szwarcman | C08G 83/001 |
| 2018/0284534 A1* | 10/2018 | Song | G02F 1/133617 |

FOREIGN PATENT DOCUMENTS

| | | |
|---|---|---|
| CN | 105467660 A | 4/2016 |
| JP | 2007334290 A | 12/2007 |
| KR | 20080004951 A | 1/2008 |

\* cited by examiner

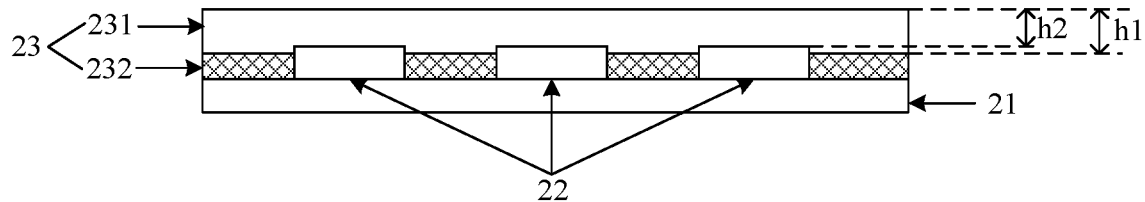
FIG. 2-6
When the thickness of the opaque film layer in the conversion layer equals to the thickness of the color resistance layer, a mask plate is disposed between the conversion layer and the source of the preset light rays. The mask plate is configured to resist the preset light rays irradiating the color resistance layer.
FIG. 2-7
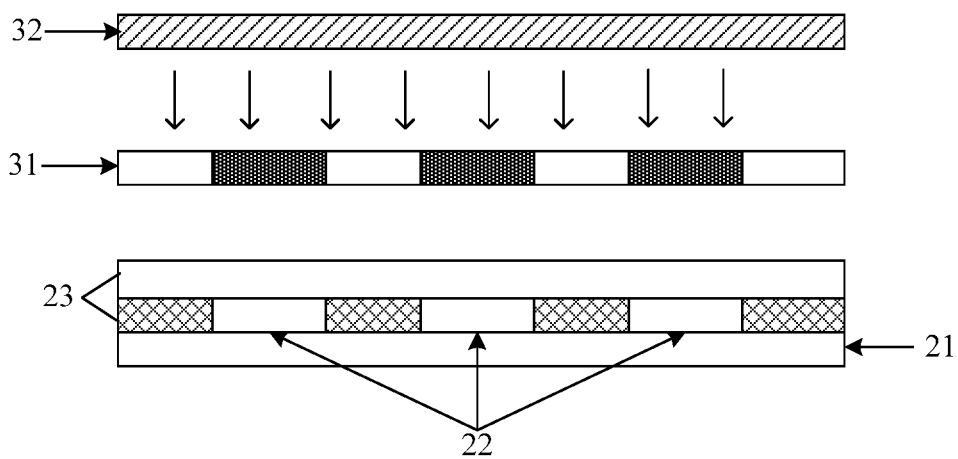
FIG. 2-8

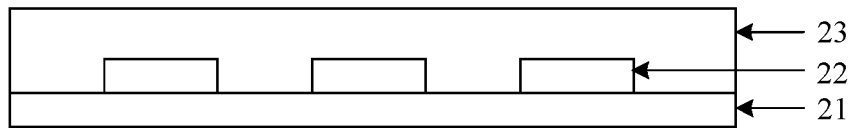
FIG. 3-3
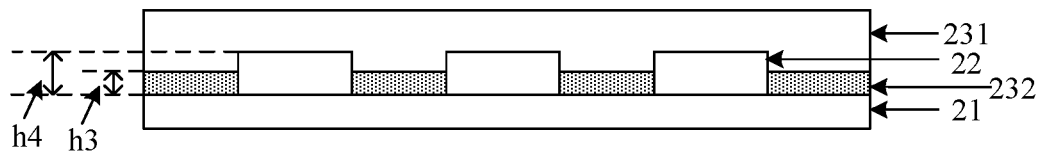
FIG. 3-4
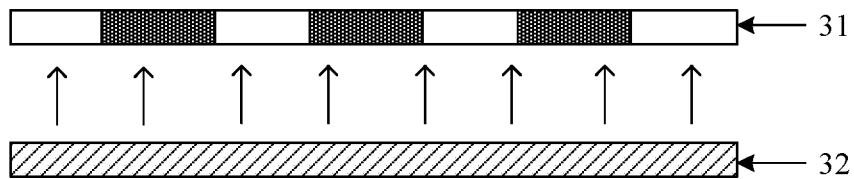
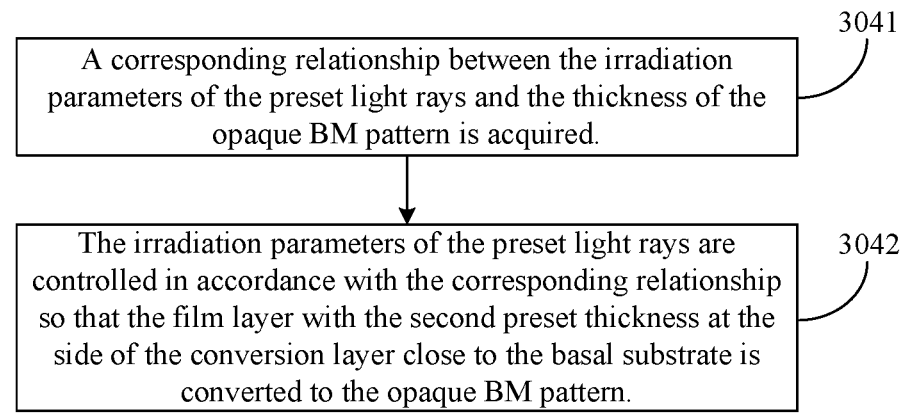
FIG. 3-5

METHOD FOR MANUFACTURING COLOR FILTER SUBSTRATE, COLOR FILTER SUBSTRATE AND DISPLAY PANEL

This application claims priority to Chinese Patent Application No.: 201710184697.6, filed with the State Intellectual Property Office on Mar. 24, 2017 and titled "Method for Manufacturing Color Filter Substrate, Color Filter Substrate and Display Panel", which is incorporated herein by reference in its entirety.

TECHNICAL FIELD

The present disclosure relates to the field of display technology, and more particularly to a method for manufacturing a color filter substrate, a color filter substrate and a display panel.

BACKGROUND

A display panel generally includes a color filter substrate, an array substrate and a liquid crystal layer formed between the two substrates. The color filter substrate generally includes a color resistance layer and a black matrix (BM) pattern, wherein the color resistance layer may include a plurality of sub-color resistance layers in different colors. The black matrix pattern is configured to separate different sub-color resistance layers.

There is provided a method for manufacturing a color filter substrate in the related art. In the method, a BM pattern is first formed on a basal substrate, then a color resistance layer is formed on the basal substrate with the BM pattern, and then an over cover (OC) layer is formed on the basal substrate with the color resistance layer. The over cover layer is configured to reduce the segment gap among various positions on the basal substrate with the BM pattern and the color resistance layer.

SUMMARY

Embodiments of the present disclosure provide a method for manufacturing a color filter substrate, a color filter substrate and a display panel. The technical solutions are as follows:

In a first aspect of the present disclosure, there is provided a method for manufacturing a color filter substrate. The method includes: forming a color resistance layer on a basal substrate; forming a conversion layer on the basal substrate with the color resistance layer, wherein the thickness of the conversion layer is greater than the thickness of the color resistance layer and the conversion layer is convertible in color under the irradiation of preset light rays; and irradiating the conversion layer with the preset light rays so that the conversion layer is converted to a two-layer structure consisting of a black matrix (BM) pattern and a transparent over cover layer, wherein the BM pattern is disposed at the side of the conversion layer close to the basal substrate.

In some embodiments, the conversion layer is manufactured by an opaque material; and irradiating the conversion layer with the preset light rays so that the conversion layer is converted to the two-layer structure consisting of the black matrix (BM) pattern and the transparent over cover layer includes: irradiating the conversion layer with the preset light rays from the side of the conversion layer away from the basal substrate so that the film layer with a first preset thickness at the side of the conversion layer away from the basal substrate is converted to the transparent over cover layer, wherein the first preset thickness is greater than the difference value between the thickness of the conversion layer and the thickness of the color resistance layer.

In some embodiments, irradiating the conversion layer with the preset light rays from the side of the conversion layer away from the basal substrate so that the film layer with the first preset thickness at the side of the conversion layer away from the basal substrate is converted to the transparent over cover layer includes: disposing a mask plate between the conversion layer and the source of the preset light rays when the thickness of an opaque film layer in the conversion layer equals to the thickness of the color resistance layer, wherein the mask plate is configured to resist the preset light rays irradiating the color resistance layer.

In some embodiments, the preset light rays are ultraviolet rays, and the conversion layer contains a photocatalyst for enabling a portion of the conversion layer irradiated by the ultraviolet rays to convert to a transparent state.

In some embodiments, the photocatalyst includes at least one material selected from the following group: titanium dioxide, zinc oxide and stannic oxide.

In some embodiments, the photocatalyst includes photocatalyst crystalline grains with a size of 1~30 nm.

In some embodiments, the mass fraction of the photocatalyst in the conversion layer is 0.1%~10%.

In some embodiments, the wavelength of the ultraviolet rays is 330~400 µm.

In some embodiments, irradiation time of the ultraviolet rays is 10~40 min.

In some embodiments, irradiating the conversion layer with the preset light rays from the side of the conversion layer away from the basal substrate so that the film layer with the first preset thickness at the side of the conversion layer away from the basal substrate is converted to the transparent over cover layer includes: irradiating the conversion layer with the preset light rays from the side of the conversion layer away from the basal substrate and controlling irradiation parameters of the preset light rays so that the film layer with the first preset thickness at the side of the conversion layer away from the basal substrate is converted to the transparent over cover layer, wherein the irradiation parameters include the intensity of the preset light rays, irradiation time of the preset light rays and wavelength of the preset light rays.

In some embodiments, before irradiating the conversion layer with the preset light rays from the side of the conversion layer away from the basal substrate and controlling the irradiation parameters of the preset light rays so that the film layer with the first preset thickness at the side of the conversion layer away from the basal substrate is converted to the transparent over cover layer, the method includes: acquiring the corresponding relationship between the irradiation parameters of the preset light rays and the thickness of the transparent over cover layer; wherein controlling the irradiation parameters of the preset light rays so that the film layer with the first preset thickness at the side of the conversion layer away from the basal substrate is converted to the transparent over cover layer includes: controlling the irradiation parameters of the preset light rays in accordance with the corresponding relationship so that the film layer with the first preset thickness at the side of the conversion layer away from the basal substrate is converted to the transparent over cover layer.

In some embodiments, forming the conversion layer on the basal substrate with the color resistance layer includes: acquiring a conversion layer material, wherein the conversion layer material contains the photocatalyst; and forming the conversion layer by means of the conversion layer material on the basal substrate with the color resistance layer.

In some embodiments, acquiring the conversion layer material includes: adding the photocatalyst to a conversion layer raw material; and applying an ultrasonic oscillation treatment so that the photocatalyst is dispersed uniformly in the conversion layer raw material, and thus the conversion layer material is obtained.

In some embodiments, the conversion layer is manufactured by a transparent material, and irradiating the conversion layer with the preset light rays so that the conversion layer is converted to a film layer whose two sides are the black matrix (BM) pattern and the transparent over cover layer respectively includes: irradiating the conversion layer with the preset light rays from the side of the basal substrate away from the color resistance layer so that the film layer with a second preset thickness at the side of the conversion layer close to the basal substrate is converted to an opaque BM pattern, wherein the second preset thickness is smaller than the thickness of the color resistance layer.

In some embodiments, before irradiating the conversion layer with the preset light rays from the side of the basal substrate away from the color resistance layer so that the film layer with the second preset thickness at the side of the conversion layer close to the basal substrate is converted to the opaque BM pattern, the method includes: disposing a mask plate between the source of the preset light rays and the basal substrate, wherein the mask plate is configured to resist the preset light rays irradiating the color resistance layer.

In some embodiments, the preset light rays are ultraviolet rays, and the conversion layer contains a photocatalyst or a transparent photosensitive material for enabling a portion of the conversion layer irradiated by the ultraviolet rays to convert to an opaque state.

In some embodiments, irradiating the conversion layer with the preset light rays from the side of the basal substrate away from the color resistance layer so that the film layer with the second preset thickness at the side of the conversion layer close to the basal substrate is converted to the opaque BM pattern includes: irradiating the conversion layer with the preset light rays from the side of the basal substrate away from the color resistance layer and controlling irradiation parameters of the preset light rays so that the film layer with the second preset thickness at the side of the conversion layer close to the basal substrate is converted to the opaque BM pattern, wherein the irradiation parameters include the intensity of the preset light rays, irradiation time of the preset light rays and wavelength of the preset light rays.

In some embodiments, before irradiating the conversion layer with the preset light rays from the side of the basal substrate away from the color resistance layer and controlling the irradiation parameters of the preset light rays so that the film layer with the second preset thickness at the side of the conversion layer close to the basal substrate is converted to the opaque BM pattern, the method includes: acquiring the corresponding relationship between the irradiation parameters of the preset light rays and the thickness of the opaque BM pattern; wherein controlling the irradiation parameters of the preset light rays so that the film layer with the second preset thickness at the side of the conversion layer close to the basal substrate is converted to the opaque BM pattern includes: controlling the irradiation parameters of the preset light rays in accordance with the corresponding relationship so that the film layer with the second preset thickness at the side of the conversion layer close to the basal substrate is converted to the opaque BM pattern.

In a second aspect of the present disclosure, there is provided a color filter substrate. The color filter substrate is a color filter substrate manufactured by any of the methods described in the first aspect.

In a third aspect, there is provided a display panel. The display panel includes the color filter substrate described in the second aspect.

BRIEF DESCRIPTION OF THE DRAWINGS

To describe the technical solutions in the embodiments of the present disclosure more clearly, the following briefly introduces the accompanying drawings that illustrate aspects of the various embodiments. The accompanying drawings in the following description show merely some embodiments of the present disclosure, and a person of ordinary skill in the art may readily derive other drawings from these accompanying drawings without creative efforts.

FIG. 2-1 is a flow chart of another method for manufacturing a color filter substrate shown in an embodiment of the present disclosure;

FIG. 2-2 is a structural schematic diagram of a basal substrate in the embodiment shown in FIG. 2-1;

FIG. 2-3 is a structural schematic diagram of another basal substrate in the embodiment shown in FIG. 2-1;

FIG. 2-4 is a flow chart of forming a conversion layer in the embodiment shown in FIG. 2-1;

FIG. 2-5 is another flow chart of forming a conversion layer in the embodiment shown in FIG. 2-1;

FIG. 2-6 is a structural schematic diagram of another basal substrate in the embodiment shown in FIG. 2-1;

FIG. 2-7 is a flow chart of forming a BM pattern and an over cover layer in the embodiment shown in FIG. 2-1;

FIG. 2-8 is a structural schematic diagram of another basal substrate in the embodiment shown in FIG. 2-1;

FIG. 2-9 is a flow chart of irradiating a conversion layer with preset light rays in the embodiment shown in FIG. 2-1;

FIG. 2-10 is a structural schematic diagram of another basal substrate in the embodiment shown in FIG. 2-1;

FIG. 3-1 is a flow chart of another method for manufacturing a color filter substrate shown in an embodiment of the present disclosure;

FIG. 3-2 is a structural schematic diagram of a basal substrate in the embodiment shown in FIG. 3-1;

FIG. 3-3 is a structural schematic diagram of another basal substrate in the embodiment shown in FIG. 3-1;

FIG. 3-4 is a structural schematic diagram of another basal substrate in the embodiment shown in FIG. 3-1;

FIG. 3-5 is a flow chart of irradiating a conversion layer with preset light rays in the embodiment shown in FIG. 3-1.

Specific embodiments of the present disclosure have been shown in the accompanying drawings above and will be illustrated below in greater detail. The accompanying drawings and text description are intended to illustrate the concept of the present disclosure with reference to the specific embodiments to those of ordinary skill in the art, instead of limiting the concept scope of the present disclosure in any way.

DETAILED DESCRIPTION

Embodiments of the present disclosure will be described in further detail with reference to the accompanying drawings, to clearly present the objects, technique solutions, and advantages of the present disclosure.

During the implementation of the present disclosure, as least the following problem has been found in the related art: the method for manufacturing a color filter substrate is relatively complicated in the related art.

Embodiments of the present disclosure provide a method for manufacturing a color filter substrate, a color filter substrate and a display panel, capable of solving the problem that the method for manufacturing a color filter substrate is relatively complicated in the related art.

Figure 1:
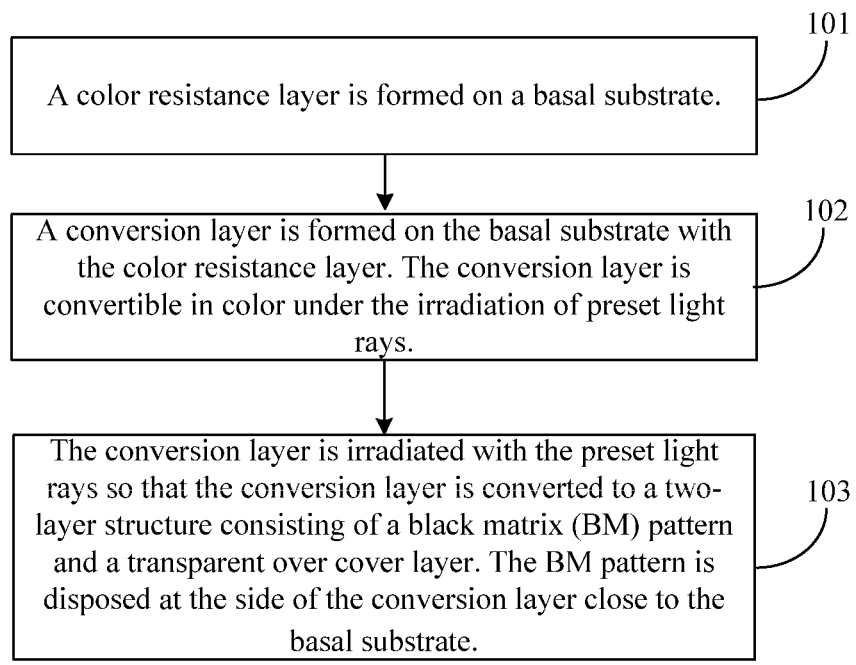
FIG. 1 is a flow chart of a method for manufacturing a color filter substrate shown in an embodiment of the present disclosure.

FIG. 1 is a flow chart of a method for manufacturing a color filter substrate shown in an embodiment of the present disclosure. The method for manufacturing a color filter substrate may include the following steps:

Step 101, a color resistance layer is formed on a basal substrate.

Step 102, a conversion layer is formed on the basal substrate with the color resistance layer. The conversion layer is convertible in color under the irradiation of preset light rays.

Step 103, the conversion layer is irradiated with the preset light rays so that the conversion layer is converted to a two-layer structure consisting of a black matrix (BM) pattern and a transparent over cover layer. The BM pattern is disposed at the side of the conversion layer close to the basal substrate.

It can be seen from above technical solution that it is not necessary to form the BM pattern and the over cover layer in separate two steps, because according to the method for manufacturing a color filter substrate provided in the embodiment of the present disclosure, the conversion layer is formed on the basal substrate with the color resistance layer, the thickness of the conversion layer is greater than the thickness of the color resistance layer, and the conversion layer is convertible in color under the irradiation of preset light rays, and therefore the conversion layer can be directly converted to the two-layer structure consisting of a BM pattern and an over cover layer by the preset light rays in one step, thereby solving the problem that the method for manufacturing a color filter substrate is relatively complicated in the related art, and achieving the effect of simplifying the method for manufacturing the color filter substrate.

Description is given below separately based on the manufacturing materials of conversion layer, i.e., a transparent material and an opaque material.

1. Conversion Layer is Manufactured by an Opaque Material.

Figures 1, 2:
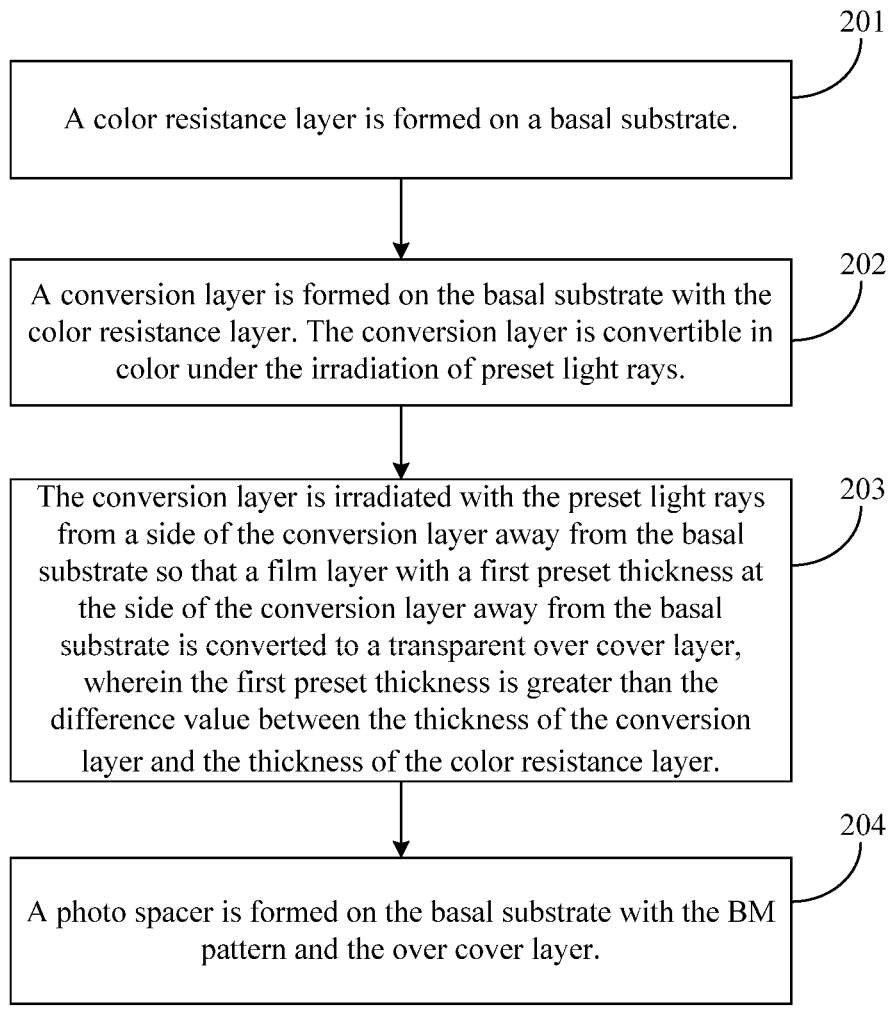
Figure 2:
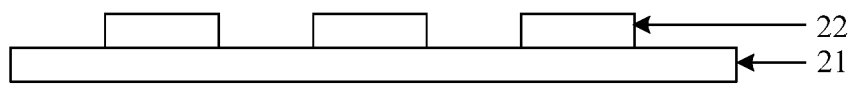

FIG. 2-1 is a flow chart of another method for manufacturing a color filter substrate shown in an embodiment of the present disclosure. The method for manufacturing the color filter substrate may include the following steps:

Step 201, a color resistance layer is formed on a basal substrate.

The color resistance layer may be first formed on the basal substrate. The color resistance layer may include sub-color resistance layers in different colors (for example, red, green and blue). In some embodiments, the color resistance layer may be formed through at least two patterning processes. Each patterning process may include coating, exposure, developing, etching, stripping and the like, which may be referenced to the related art and will not be repeated herein.

The structure of the basal substrate may be as shown in FIG. 2-2 at the end of step 201. Here, a color resistance layer 22 is formed on a basal substrate 21.

Step 202, a conversion layer is formed on the basal substrate with the color resistance layer. The conversion layer is convertible in color under the irradiation of preset light rays.

The thickness of the conversion layer is greater than the thickness of the color resistance layer. In some embodiments, the thickness of the conversion layer may be equal to the sum of the thickness of the over cover layer and the thickness of the BM pattern in the related art. Exemplarily, the thickness of the conversion layer may be 2-5 μm. Since the thickness of the conversion layer is relatively big, the side of the conversion layer away from the basal substrate is relatively flat.

Figures 2, 3:
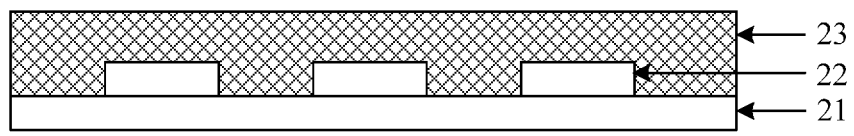

The structure of the basal substrate may be as shown in FIG. 2-3 at the end of step 202. Here, a conversion layer 23 is formed on the basal substrate 21 with the color resistance layer 22.

Additionally, the preset light rays may be ultraviolet rays. Ultraviolet ray is the generic term for radiation with wavelength of 100~400 nm in electromagnetic spectrum.

The conversion layer material may be the same as that of the BM pattern in the related art. The conversion layer contains a photocatalyst for enabling a portion of the conversion layer irradiated by the ultraviolet rays to convert to a transparent state. The photocatalyst includes at least one material selected from the following group: titanium dioxide ($TiO_2$), zinc oxide (ZnO) and stannic oxide ($SnO_2$). And the mass fraction of the photocatalyst in the conversion layer is 0.1%~10%. Mass fraction refers to the percentage of the mass of a substance in the total mass of a whole entity (for example a mixture).

In some embodiments, the photocatalyst includes photocatalyst crystalline grains with a size of 1~30 nm.

Figures 2, 3, 4:
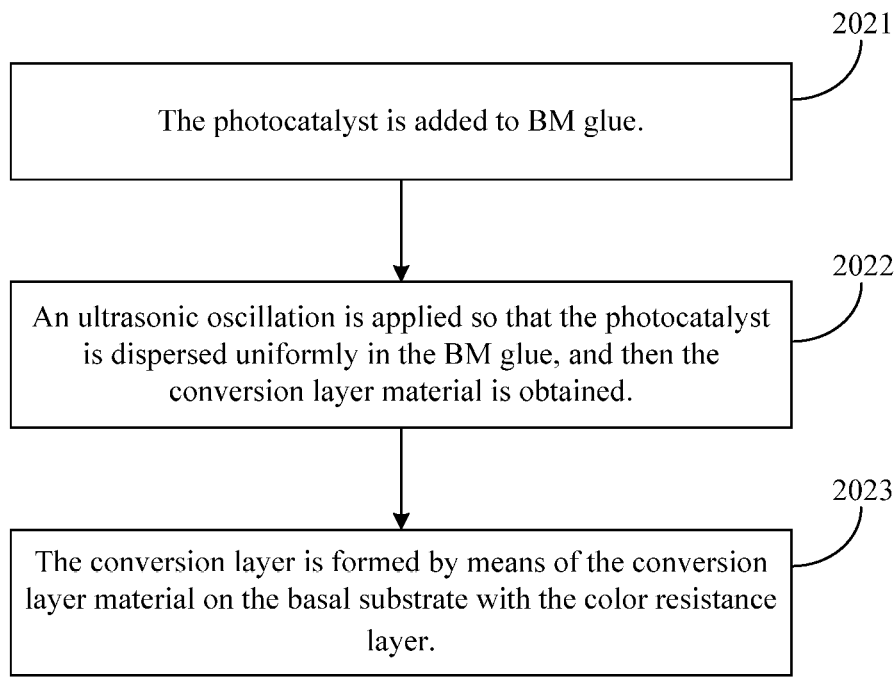

As shown in FIG. 2-4, in one implementation, this step may include the following three sub-steps:

Sub-step 2021, the photocatalyst is added to BM glue.

BM glue is the raw material for forming the BM pattern. The BM glue includes a transparent substrate and organic dyes.

Sub-step 2022, an ultrasonic oscillation is applied so that the photocatalyst is dispersed uniformly in the BM glue, and then the conversion layer material is obtained.

Apart from the ultrasonic oscillation, the photocatalyst may also be dispersed uniformly in the BM glue in other ways in the embodiment of the present disclosure and will not be limited herein. After the photocatalyst is dispersed uniformly in the BM glue, the BM glue containing the photocatalyst can also be referred as conversion layer material.

Sub-step 2023, the conversion layer is formed by means of the conversion layer material on the basal substrate with the color resistance layer.

The conversion layer may be formed on the basal substrate with the color resistance layer by means of the conversion layer material as the raw material via coating and the like.

As shown in FIG. 2-5, in another implementation, this step may include the following two sub-steps:

Sub-step 2024, the conversion layer material is acquired. The conversion layer material contains a photocatalyst.

The process for acquiring the photocatalyst may include:
1) adding the photocatalyst to the conversion layer raw material;

The conversion layer raw material may be the BM glue, and the photocatalyst may include at least one material selected from the following group: titanium dioxide, zinc oxide and stannic oxide. In addition, the mass fraction of the photocatalyst in the conversion layer is 0.1%~10%.

2) applying an ultrasonic oscillation treatment so that the photocatalyst is dispersed uniformly in the conversion layer raw material, and the conversion layer material is obtained.

Ultrasonic oscillation treatment is a way of stirring the solution through the oscillation generated by high frequency sound waves of the ultrasonic waves. In this way, the photocatalyst can be dispersed uniformly in the conversion layer raw material, such that the conversion layer raw material turns to the conversion layer material. Additionally, the photocatalyst may also dispersed uniformly in the conversion layer raw material in other ways in the embodiment of the present disclosure. For example, the photocatalyst may be dispersed uniformly in the conversion layer raw material by way of shaking the conversion layer raw material in which the photocatalyst has been added (the conversion layer raw material in which the photocatalyst has been added can be put into a vessel, and the effect of shaking the conversion layer raw material in which the photocatalyst has been added may be achieved by way of shaking the vessel), or by way of stirring the conversion layer raw material in which the photocatalyst has been added, which will not limited in the embodiment of the present disclosure.

Sub-step 2025, the conversion layer is formed by means of the conversion layer material on the basal substrate with the color resistance layer.

The conversion layer may be formed with the conversion layer material as the raw material on the basal substrate provided with the color resistance layer by way of coating and the like.

It should be noted that photocatalyst was discovered by a Japanese scholar in the 1960s and 1970s. Taking $TiO_2$ as an example, the crystalline grain size of $TiO_2$ as a photocatalyst component is mostly in a nanometer range (1 nm~3 nm). Both the photocatalyst with $TiO_2$ as the single active component and the composite photocatalyst manufactured by doping $TiO_2$ and other substances can effectively degrade organic dyes, such as tetrabasic lead sulfate (4BS), methylene blue and reactive yellow. The degradation principle is mostly to first damage the chemical bonds with high bond energy, such as C=C double bond, N=N double bond, etc., and then to damage the chemical bonds with medium bond energy, such as benzene ring, naphthalene nucleus, etc., to transform the organic molecules of the dyestuffs from a macromolecular structure to a small molecule structure so as to make the organic molecules gradually become inorganic, thereby achieving the effect of degradation. In the embodiment of the present disclosure, the degradation principle for the organic dyes in the opaque conversion layer is substantially the same as that described above, both of which are to degrade the molecules of the organic dyes in the conversion layers through photocatalysis to make the organic dyes fade and make the molecules of the organic dyes become inorganic, so as to gradually form the BM pattern and the OC layer.

Additionally, in the embodiment of the present disclosure, the conversion layer may also contain a photosensitive material. The photosensitive material realizes the function that the conversion layer is irradiated by the preset light rays to form the BM pattern and the OC layer. Exemplarily, the opaque conversion layer may be manufactured by way of adding an opaque photosensitive material in the transparent substrate. The photosensitive material may fade after being irradiated by the preset light rays to enable the portion of the conversion layer irradiated by the preset light rays to convert to a transparent state.

Step 203, the conversion layer is irradiated with the preset light rays from the side of the conversion layer away from the basal substrate so that a film layer with a first preset thickness at the side of the conversion layer away from the basal substrate is converted to a transparent over cover layer, wherein the first preset thickness is greater than the difference value between the thickness of the conversion layer and the thickness of the color resistance layer.

That is, the thickness of the opaque portion in the conversion layer is smaller than the thickness of color resistance layer such that the color resistance layer is exposed. When the preset light rays are ultraviolet rays, the wavelength of the ultraviolet rays may be 330~400 µm and the irradiation time of the ultraviolet rays may be 10~40 min.

The structure of the basal substrate may be as shown in FIG. 2-6 at the end of step 203. Here, the conversion layer 23 converts to a film layer comprising an opaque BM pattern 232 and a transparent over cover layer 231. The thickness h1 (i.e., the first preset thickness) of the over cover layer 231 is greater than the difference value h2 between the thickness of the conversion layer 23 and the thickness of the color resistance layer 22.

As shown in FIG. 2-7, in one implementation, when the photocatalyst in the conversion layer may have an influence on the color resistance layer, step 203 may include the following one sub-step:

Sub-step 2031, when the thickness of the opaque film layer in the conversion layer equals to the thickness of the color resistance layer, a mask plate is disposed between the conversion layer and the source of the preset light rays. The mask plate is configured to resist the preset light rays irradiating the color resistance layer.

The mask plate may avoid the preset light rays irradiating the color resistance layer, thereby avoiding the potential influence on the color resistance layer caused by the preset light rays.

The structure of the basal substrate may be as shown in FIG. 2-8 after the mask plate is disposed at sub-step 2031. Here, the mask plate is disposed between the source 32 of the preset light rays and the conversion layer 23. The source 32 of the preset light rays may be an area source and the preset light rays may be ultraviolet rays.

It should be noted that, when the photocatalyst in the conversion layer do not have an influence on the color resistance layer, step 203 may not include sub-step 2031.

As shown in FIG. 2-9, in another implementation, step 203 may include the following two sub-steps:

Sub-step 2032, the corresponding relationship between the irradiation parameters of the preset light rays and the thickness of the transparent over cover layer is acquired.

The corresponding relationship between the irradiation parameters of the preset light rays and the thickness of the transparent over cover layer may be acquired through experiments. The corresponding relationship may be in a table form, or in a curve form, which will not limited in the embodiment of present disclosure. Here, the irradiation parameters may include the intensity of the preset light rays (the intensity unit may be lux), irradiation time of the preset light rays and wavelength of the preset light rays.

Sub-step 2033, when the conversion layer is irradiated with the preset light rays from the side of the conversion layer away from the basal substrate, the irradiation parameters of the preset light rays are controlled in accordance with the corresponding relationship so that the film layer with the first preset thickness at the side of the conversion layer away from the basal substrate is converted to the transparent over cover layer.

A target irradiation parameter may be determined first in accordance with the corresponding relationship between the irradiation parameters and the thickness of the transparent over cover layer as well as the first preset thickness, and then the irradiation parameters of the preset light rays irradiating the conversion layer from the side of the conversion layer away from the basal substrate may be controlled in accordance with the target irradiation parameter, so that the film layer with the first preset thickness at the side of the conversion layer away from the basal substrate is converted to the transparent over cover layer.

In the method for manufacturing a color filter substrate provided in the embodiment of the present disclosure, the BM pattern and the over cover layer are actually converted from one film layer. The flat degree of the over cover layer is relatively high, which can avoid the problems of undesirable alignment and Rubbing Mura (Rubbing Mura refers to the undesirable defects caused by the damage to the alignment film during the rubbing alignment process) in the subsequent cell-assembly process caused by insufficient flatness of the over cover layer in the related art.

Step 204, a photo spacer is formed on the basal substrate with the BM pattern and the over cover layer.

The photo spacer (PS) is configured to control the distance between the color filter substrate and the array substrate in the subsequent cell-assembly process.

The structure of the basal substrate may be as shown in FIG. 2-10 at the end of the present step. Here, a photo spacer 33 is distributed on the over cover layer 231. Meanings of other signs in FIG. 2-10 may be referenced to FIG. 2-5 and will not be repeated herein.

It can be seen from above technical solution that it is not necessary to form the BM pattern and the over cover layer in separate two steps, because according to the method for manufacturing a color filter substrate in the embodiment of the present disclosure, the conversion layer is formed on the basal substrate with the color resistance layer, the thickness of the conversion layer is greater than the thickness of the color resistance layer, and the conversion layer is convertible in color under the irradiation of preset light rays, and therefore the conversion layer can be directly converted to the two-layer structure consisting of a BM pattern and an over cover layer by the preset light rays in one step, thereby solving the problem that the method for manufacturing a color filter substrate is relatively complicated in the related art, and achieving the effect of simplifying the method for manufacturing the color filter substrate.

2. Conversion Layer is Manufactured by the Transparent Material.

FIG. 3-1 is a flow chart of another method for manufacturing a color filter substrate shown in an embodiment of the present disclosure. The method for manufacturing the color filter substrate may include the following steps:

Step 301, a color resistance layer is formed on a basal substrate.

The color resistance layer may be first formed on the basal substrate. The color resistance layer may include sub-color resistance layers in different colors.

The structure of the basal substrate may be as shown in FIG. 2-2 at the end of step 301.

Step 302, a conversion layer is formed on the basal substrate with the color resistance layer. The conversion layer is convertible in color under the irradiation of preset light rays.

Exemplarily, the conversion layer may be formed on the basal substrate with the color resistance layer by means of the conversion layer material as the raw material via coating and the like.

The thickness of the conversion layer is greater than the thickness of the color resistance layer. In some embodiment, the thickness of the conversion layer may equal to the sum of the thickness of the over cover layer and the thickness of the BM pattern in the related art. Since the thickness of the conversion layer is relatively big, the side of the conversion layer away from the basal substrate is relatively flat.

The conversion layer material may be the same as the material of the OC layer in the related art, and the preset light rays may be ultraviolet rays. The conversion layer contains a photocatalyst or a transparent photosensitive material for enabling a portion of the conversion layer irradiated by the ultraviolet rays to convert to an opaque state. The portion of the conversion layer that converts to the opaque state may be black.

The structure of the basal substrate may be as shown in FIG. 3-2 at the end of step 302. Here, the transparent conversion layer 23 is disposed on the basal substrate 21 with the color resistance layer 22.

Step 303, a mask plate is disposed between the source of the preset light rays and the basal substrate. The mask plate is configured to resist the preset light rays irradiating the color resistance layer.

After the mask plate is disposed between the source of the preset light rays and the basal substrate, the structure of the basal substrate may be as shown in FIG. 3-3. A mask plate 31 is disposed between the source 32 of the preset light rays and the basal substrate 21. The source 32 of the preset light rays may be an area source, and the preset light rays may be ultraviolet rays. The mask plate 31 may include an opening area and a shielding area. The area excluding the shielding area on the mask plate 31 is the opening area. The orthographic projection of the color resistance layer 22 on the basal substrate 21 may overlap with the orthographic projection of the shielding area on the basal substrate 21, or the orthographic projection of the color resistance layer 22 on the basal substrate 21 may be within the orthographic projection of the shielding area on the basal substrate 21.

Step 304, the conversion layer is irradiated with the preset light rays from the side of the basal substrate away from the color resistance layer so that a film layer with a second preset thickness at the side of the conversion layer close to the basal substrate is converted to an opaque BM pattern. The second preset thickness is smaller than the thickness of the color resistance layer.

The structure of the basal substrate may be as shown in FIG. 3-4 at the end of step 304. The thickness h3 of the BM pattern 232 is smaller than the thickness h4 of the color resistance layer 22. Here, 231 represents an over cover layer. Meanings of other signs in FIG. 3-4 may be referenced to FIG. 3-3 and will not be repeated herein.

Figures 2, 3, 4, 5:
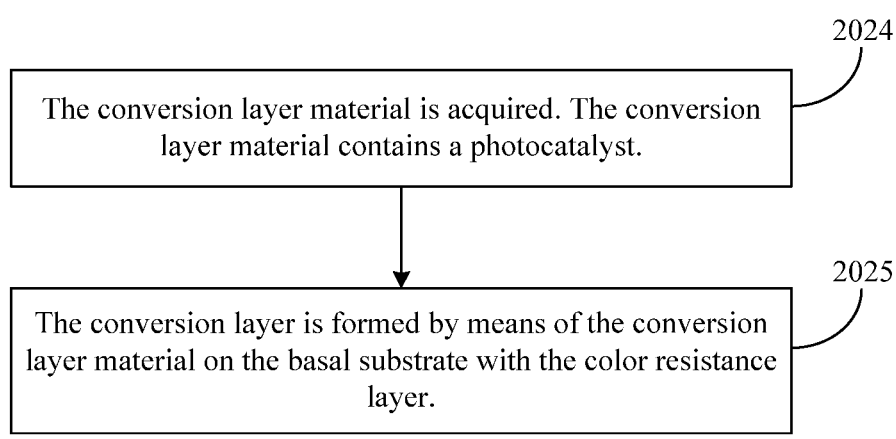
Figures 2, 3, 4, 5, 6, 7, 8, 9:
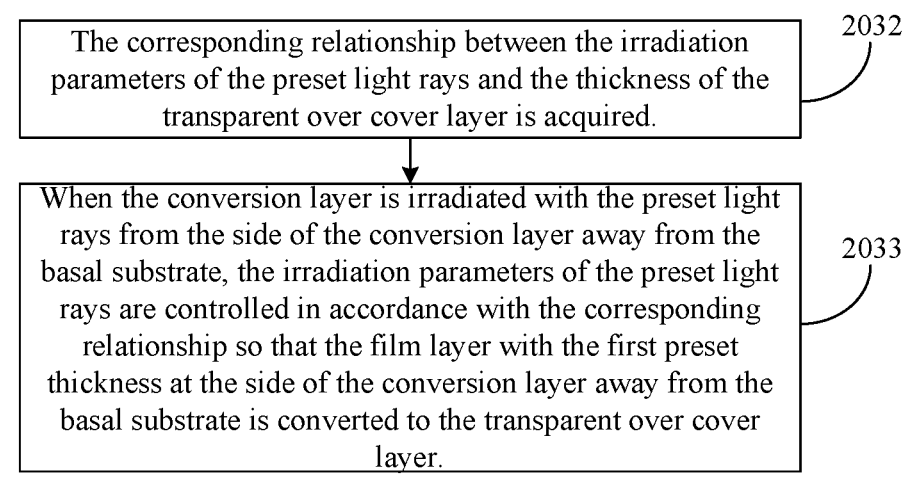
Figures 2, 3, 4, 5, 6, 7, 8, 9, 10:
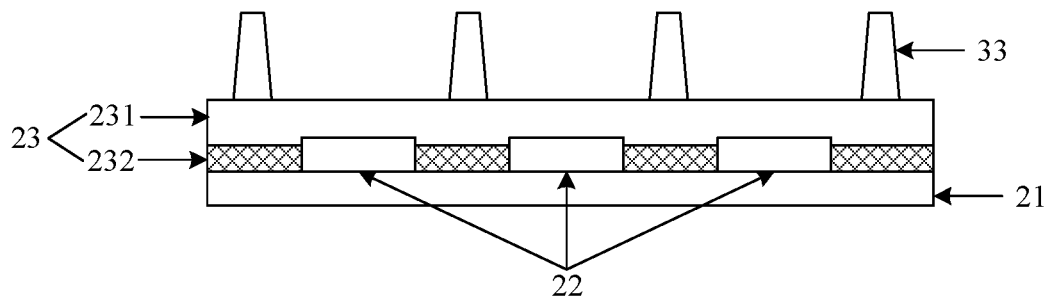
Figures 1, 3:
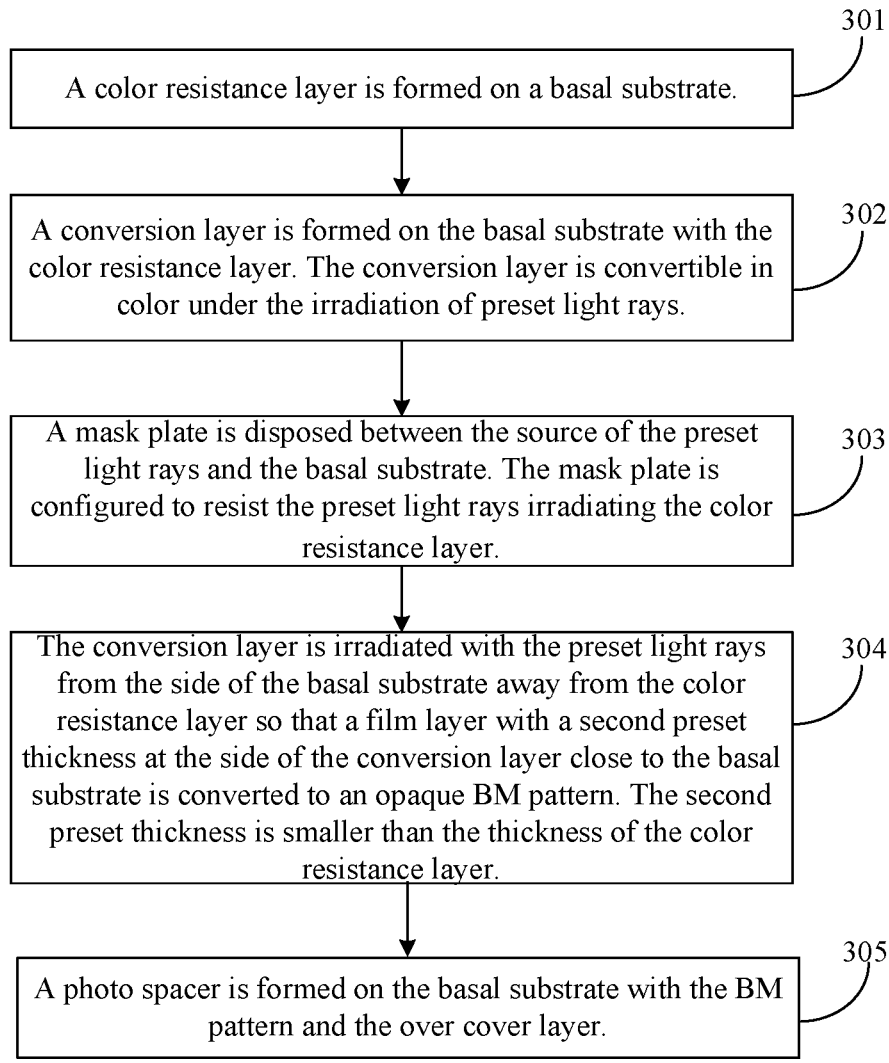
Figures 2, 3:
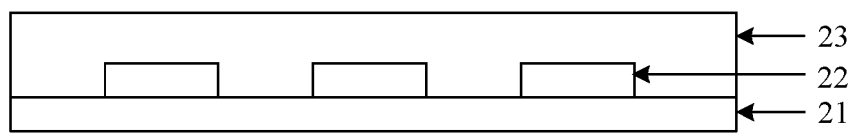

As shown in FIG. 3-5, this step may include the following two sub-steps:

Sub-step 3041, a corresponding relationship between the irradiation parameters of the preset light rays and the thickness of the opaque BM pattern is acquired.

The corresponding relationship between the irradiation parameters of the preset light rays and the thickness of the opaque BM pattern may be acquired through experiments. The corresponding relationship may be in a table form, or in a curve form, which will not limited in the embodiment of present disclosure. Here, the irradiation parameters may include the intensity of the preset light rays (the intensity unit may be lux), irradiation time of the preset light rays and wavelength of the preset light rays.

Sub-step 3042, the irradiation parameters of the preset light rays are controlled in accordance with the corresponding relationship so that the film layer with the second preset thickness at the side of the conversion layer close to the basal substrate is converted to the opaque BM pattern.

A target irradiation parameter may first be determined in accordance with the corresponding relationship between the irradiation parameters and the thickness of the opaque BM pattern as well as the second preset thickness, and then the irradiation parameters of the preset light rays irradiating the conversion layer from the side of the basal substrate away from the color resistance layer may be controlled in accordance with the target irradiation parameter, so that the film layer with the second preset thickness at the side of the conversion layer close to the basal substrate is converted to the opaque BM pattern.

Step 305, a photo spacer is formed on the basal substrate with the BM pattern and the over cover layer.

The structure of the basal substrate may be as shown in FIG. 2-10 at the end of step 305.

It can be seen from above technical solution that it is not necessary to form the BM pattern and the over cover layer in separate two steps, because according to the method for manufacturing a color filter substrate provided in the embodiment of the present disclosure, the conversion layer is formed on the basal substrate with the color resistance layer, the thickness of the conversion layer is greater than the thickness of the color resistance layer, and the conversion layer is convertible in color under the irradiation of preset light rays, and therefore the conversion layer can be directly converted to the two-layer structure consisting of a BM pattern and an over cover layer by the preset light rays in one step, thereby solving the problem that the method for manufacturing a color filter substrate is relatively complicated in the related art, and achieving the effect of simplifying the method for manufacturing the color filter substrate.

The present disclosure further provides a color filter substrate. The color filter substrate is manufactured by the method shown in FIG. 2-1, or by the method shown in FIG. 3-1.

The present disclosure further provides a display panel. The display panel includes the color filter substrate provided in the embodiments of the present disclosure.

The present disclosure further provides a display device. The display device includes the display panel provided in the embodiments of the present disclosure. The display device may be a mobile phone, a tablet, a smart wearable device, a desktop computer, a laptop computer or the like.

In the present disclosure, the term "at least one of A and B" merely describes the correspondence of corresponding objects, indicating three kinds of relationship. For example, "at least one of A and B" can be expressed as: A exists alone, A and B exist concurrently, and B exists alone. Similarly, "at least one of A, B and C" may indicate seven kinds of relationship and may be expressed as: A exists alone, B exists alone, C exists alone, A and B exist concurrently, A and C exist concurrently, C and B exist concurrently, and A, B and C exist concurrently. Similarly, "at least one of A, B, C and D" may indicate fifteen kinds of relationship and may be expressed as: A exists alone, B exists alone, C exists alone, D exists alone, A and B exist concurrently, A and C exist concurrently, A and D exist concurrently, C and B exist concurrently, D and B exist concurrently, C and D exist concurrently, A, B and C exist concurrently, A, B and D exist concurrently, A, C and D exist concurrently, B, C and D exist concurrently, and A, B, C and D exist concurrently.

Persons of ordinary skill in the art can understand that all or part of the steps described in the above embodiments can be completed through hardware, or through relevant hardware instructed by programs stored in a computer readable storage medium, such as a read-only memory, a disk or a CD, etc.

The foregoing examples are only some embodiments of the present disclosure, and are not intended to limit the present disclosure. Within the spirit and principles of the disclosure, any modifications, equivalent substitutions, improvements, etc., are within the scope of protection of the present disclosure.

What is claimed is:

1. A method for manufacturing a color filter substrate, comprising:

forming a color resistance layer on a basal substrate;

forming a conversion layer on the basal substrate with the color resistance layer, wherein the conversion layer includes a first conversion sub-layer that absolutely overlaps with the color resistance layer and a second conversion sub-layer that does not overlap with the color resistance layer; wherein the thickness of the second conversion sub-layer is greater than the thickness of the color resistance layer and the conversion layer is convertible in color under the irradiation of preset light rays; wherein the conversion layer is manufactured by an opaque material; and irradiating the conversion layer with the preset light rays from the side of the conversion layer away from the basal substrate and controlling irradiation parameters of the preset light rays, so that the film layer at the side of the conversion layer away from the basal substrate is converted to an opaque first over cover sub-layer, and the film layer with a first preset thickness of the second conversion sub-layer at the side of the conversion layer away from the basal substrate is converted to an opaque second over cover sub-layer, the conversion layer is converted to a two-layer structure consisting of a black matrix (BM) pattern and a transparent over cover layer, wherein the over cover layer includes the first over cover sub-layer and the second over cover sub-layer, wherein the first preset thickness is greater than a difference value between the thickness of the second over cover sub-layer and the thickness of the color resistance layer;

wherein the conversion layer contains a photocatalyst for enabling a portion of the conversion layer irradiated by the preset light rays to convert to a transparent state;

wherein the BM pattern is disposed at the side of the conversion layer close to the basal substrate.

2. The method of claim 1, wherein irradiating the conversion layer with the preset light rays from the side of the conversion layer away from the basal substrate, so that the film layer at the side of the conversion layer away from the basal substrate is converted to an opaque first over cover sub-layer, and the film layer with a first preset thickness of the second conversion sub-layer at the side of the conversion layer away from the basal substrate is converted to an opaque second over cover sub-layer includes:

disposing a mask plate between the conversion layer and a source of the preset light rays when the thickness of the first over cover sub-layer equals to the thickness of the second over cover sub-layer, wherein the mask plate is configured to resist the preset light rays irradiating the color resistance layer.

3. The method of claim 1, wherein the preset light rays are ultraviolet rays, and the conversion layer contains a photocatalyst for enabling a portion of the conversion layer irradiated by the ultraviolet rays to convert to a transparent state.

4. The method of claim 3, wherein the photocatalyst includes at least one material selected from the following group: titanium dioxide, zinc oxide and stannic oxide.

5. The method of claim 4, wherein the photocatalyst includes photocatalyst crystalline grains with a size of 1~30 nm.

6. The method of claim 3, wherein the mass fraction of the photocatalyst in the conversion layer is 0.1%~10%.

7. The method of claim 3, wherein the wavelength of the ultraviolet rays is 330~400 μm.

8. The method of claim 7, wherein the irradiation time of the ultraviolet rays is 10~40 min.

9. The method of claim 1, before irradiating the conversion layer with the preset light rays from the side of the conversion layer away from the basal substrate, so that the film layer at the side of the conversion layer away from the basal substrate is converted to an opaque first over cover sub-layer, further includes:
acquiring a corresponding relationship between the irradiation parameters of the preset light rays and the thickness of the transparent over cover layer;
wherein controlling the irradiation parameters of the preset light rays so that the film layer with a first preset thickness of the second conversion sub-layer at the side of the conversion layer away from the basal substrate is converted to an opaque second over cover sub-layer includes:
controlling the irradiation parameters of the preset light rays in accordance with the corresponding relationship so that the film layer with the first preset thickness at the side of the conversion layer away from the basal substrate is converted to the transparent over cover layer.

10. The method of claim 3, wherein forming the conversion layer on the basal substrate with the color resistance layer includes:
acquiring a conversion layer material, wherein the conversion layer material contains the photocatalyst; and
forming the conversion layer by means of the conversion layer material on the basal substrate with the color resistance layer.

11. The method of claim 10, wherein acquiring the conversion layer material includes:
adding the photocatalyst to a conversion layer raw material; and
applying an ultrasonic oscillation treatment so that the photocatalyst is dispersed uniformly in the conversion layer raw material, and the conversion layer material is obtained.

* * * * *